(12) United States Patent
Sharma et al.

(10) Patent No.: US 10,832,187 B2
(45) Date of Patent: Nov. 10, 2020

(54) DATA PROCESSOR FOR INTEGRATING AGILE DEVELOPMENT PROJECTS INTO AN END-TO-END DEVELOPMENT PLATFORM

(71) Applicant: Accenture Global Services Limited, Dublin (IE)

(72) Inventors: Vibhu Saujanya Sharma, Bangalore (IN); Vikrant S. Kaulgud, Pune (IN); Parikshit Maniar, Bangalore (IN); Sanjeev Vohra, Bangalore (IN); Sanjay Mittal, Bangalore (IN); Aravindan Thoppe Santharam, Bangalore (IN); Michael A. Brinkley, Hyderabad (IN); Gurdeep Virdi, Bangalore (IN); Pradeepkumar Duraisamy Soundrapandian, Sivakasi (IN)

(73) Assignee: Accenture Global Services Limited, Dublin (IE)

( * ) Notice: Subject to any disclaimer, the term of this patent is extended or adjusted under 35 U.S.C. 154(b) by 686 days.

(21) Appl. No.: 15/178,272

(22) Filed: Jun. 9, 2016

(65) Prior Publication Data
US 2016/0364675 A1 Dec. 15, 2016

(30) Foreign Application Priority Data
Jun. 12, 2015 (IN) .......................... 2953/CHE/2015

(51) Int. Cl.
*G06Q 10/06* (2012.01)
*G06Q 10/10* (2012.01)
*A63F 13/80* (2014.01)

(52) U.S. Cl.
CPC ............... *G06Q 10/063114* (2013.01); *G06Q 10/06311* (2013.01); *G06Q 10/06393* (2013.01);
(Continued)

(58) Field of Classification Search
None
See application file for complete search history.

(56) References Cited

U.S. PATENT DOCUMENTS 6,026,397 A * 2/2000 Sheppard .............. G06F 16/355
2004/0260574 A1* 12/2004 Gross .................... G06Q 30/02
705/1.1

(Continued)

FOREIGN PATENT DOCUMENTS

WO 2009102728 A1 8/2009

OTHER PUBLICATIONS

Passos, "Turning Real-World Software Development into a Game," 2011, 2011 Brazilian Symposium on Games and Digital Entertainment, IEEE, pp. 260-269 (Year: 2011).*

(Continued)

*Primary Examiner* — Ivan R Goldberg
(74) *Attorney, Agent, or Firm* — Harrity & Harrity, LLP

(57) ABSTRACT

A device may evaluate first data to identify a plurality of users, where each user, of the plurality of users, is assigned to complete a portion of a group task. The device may evaluate the first data to select a first user, of the plurality of users, for completion of a particular portion of the group task based on a first set of decision criteria. The device may provide, to the first user, information identifying the particular portion of the group task. The device may receive second data relating to the particular portion of the group task after providing information identifying the particular portion of the group task. The device may evaluate the first data to select a second user, of the plurality of users, based on a second set of decision criteria. The device may provide, to the second user, information associated with the second data.

20 Claims, 10 Drawing Sheets

(52) U.S. Cl.
CPC ............. *G06Q 10/06398* (2013.01); *G06Q 10/063118* (2013.01); *G06Q 10/1097* (2013.01); *A63F 13/80* (2014.09)

(56) References Cited

U.S. PATENT DOCUMENTS

| | | | |
|---|---|---|---|
| 2009/0204470 A1 | 8/2009 | Weyl et al. | |
| 2010/0299170 A1* | 11/2010 | Savescu | G06Q 10/0633 705/7.12 |
| 2011/0252394 A1* | 10/2011 | Sharma | G06F 11/3616 717/101 |
| 2012/0317541 A1* | 12/2012 | Kaulgud | G06F 11/3604 717/102 |
| 2013/0024452 A1* | 1/2013 | Defusco | G06Q 10/063118 707/737 |
| 2013/0073533 A1* | 3/2013 | Hickey | G06K 9/00483 707/706 |
| 2013/0325763 A1* | 12/2013 | Cantor | G06Q 10/0633 706/12 |
| 2014/0142998 A1* | 5/2014 | Kroeger | G06Q 10/06311 705/7.13 |
| 2014/0162220 A1* | 6/2014 | Rao | G09B 19/18 434/107 |
| 2014/0164037 A1* | 6/2014 | Rao | G06Q 30/0207 705/7.13 |
| 2014/0344775 A1* | 11/2014 | Dunne | G06Q 10/06 717/101 |
| 2015/0254597 A1* | 9/2015 | Jahagirdar | G06Q 10/06313 705/7.15 |
| 2016/0232003 A1* | 8/2016 | Kompella | G06F 8/77 |
| 2016/0274904 A1* | 9/2016 | Niazi | G06F 3/04817 |
| 2016/0364210 A1* | 12/2016 | Davidov | G06F 8/20 |

OTHER PUBLICATIONS

Yuan, "Attributed Based Access Control (ABAC) for Web Services," 2005, Proceedings of the IEEE International Conference on Web Services (ICWS '05), pp. 1-9 (Year: 2005).*

Mak, "Task Coordination in an Agile Distributed Software Development Environment," 2006, Canadian Conference on Electrical and Computer Engineering, IEEE, pp. 606-611 (Year: 2006).*

* cited by examiner

US 10,832,187 B2

DATA PROCESSOR FOR INTEGRATING AGILE DEVELOPMENT PROJECTS INTO AN END-TO-END DEVELOPMENT PLATFORM

RELATED APPLICATIONS

This application claims priority under 35 U.S.C. § 119 to Indian Patent Application No. 2953/CHE/2015, filed on Jun. 12, 2015, the content of which is incorporated by reference herein in its entirety.

BACKGROUND

A development project may be completed by multiple teams of developers, each working on portions of the development project from different locations. The development project may be managed by one or more managers, who may assign tasks to developers associated with each team of the multiple teams. The one or more managers may utilize a development platform to organize one or more portions of the development project, such as assignment of tasks, tracking of task completion, or the like.

SUMMARY

According to some possible implementations, a device may include one or more processors. The one or more processors may receive first data from a data structure. The one or more processors may automatically evaluate the first data to identify a plurality of users, where each user, of the plurality of users, is assigned to complete a portion of a group task. The one or more processors may automatically evaluate the first data to select a first user, of the plurality of users, for completion of a particular portion of the group task based on a first set of decision criteria. The one or more processors may provide, to the first user, information identifying the particular portion of the group task. The one or more processors may receive second data relating to the particular portion of the group task after providing information identifying the particular portion of the group task. The one or more processors may automatically evaluate the first data to select a second user, of the plurality of users, based on a second set of decision criteria. The second user may be different from the first user. The one or more processors may provide, to the second user, information associated with the second data.

According to some possible implementations, a non-transitory computer-readable medium may store one or more instructions that, when executed by one or more processors, may cause the one or more processors to receive project information regarding a development project. The development project may be associated with one or more agile methodologies. The one or more instructions, when executed by the one or more processors, may cause the one or more processors to generate an agile development user interface that provides information regarding the development project. The information may include collaboration information associated with facilitating message exchange between a plurality of users of the agile development user interface, metrics information regarding one or more metrics associated with the development project, or alert information regarding one or more updates to the development project. The one or more instructions, when executed by the one or more processors, may cause the one or more processors to provide, to a first user associated with a first role of the development project, a first presentation of the agile development user interface. The first presentation may include a first subset of the information regarding the development project and associated with the first role. The one or more instructions, when executed by the one or more processors, may cause the one or more processors to provide, to a second user associated with a second role of the development project, a second presentation of the agile development user interface. The second presentation may include a second subset of information regarding the development project and associated with the second role. The one or more instructions, when executed by the one or more processors, may cause the one or more processors to monitor progress of the development project. The one or more instructions, when executed by the one or more processors, may cause the one or more processors to dynamically update the first presentation and the second presentation of the agile development user interface to provide information regarding progress of the development project.

According to some possible implementations, a method may include selecting, by a device, a particular task, from a set of tasks of a project, for completion by one or more users of a set of users assigned to the project. The method may include generating, by the device, information associated with identifying the particular task. The method may include providing, by the device, the information associated with identifying the particular task to the one or more users. The method may include monitoring, by the device, progress of completion of the particular task by the one or more users. The method may include providing, by the device, a user interface, for display to another user of the set of users. The user interface may include a set of projections relating to completion of the project that includes the particular task based on the progress of completion of the particular task. The other user may not be included in the one or more users.

DETAILED DESCRIPTION

The following detailed description of example implementations refers to the accompanying drawings. The same reference numbers in different drawings may identify the same or similar elements.

A development project may be completed by multiple teams of developers working from multiple different locations. The development project may be governed by agile methodologies (e.g., an agile development project). Agile development (e.g., development using agile methodologies) may include techniques associated with adaptive planning, early delivery, multiple improvement cycles, rapid and/or flexible responses to project alterations, or the like. A development platform may be utilized to organize one or more portions of the agile development project. However, the development platform may be directed to a limited subset of portions of the agile development project, such as managing agile artifact development.

Implementations, described herein, may integrate process governance aspects of agile development, additional project phases, or the like into an end-to-end development platform, thereby facilitating improved project management relative to another development platform lacking such integrations. By integrating multiple modules into an end-to-end agile development, such as modules related to process guidance and visibility, cross-project governance, agile methods, metrics, agile development tools, contextual collaboration, gamification, or the like, the development platform may reduce the likelihood of cost overruns, delays, or errors in an agile development project relative to a project developed without an end-to-end development platform.

Moreover, the development platform may reduce communications across a network by automatically identifying information of interest to a particular user based on a particular role of the particular user and distributing the information to the particular user, rather than the particular user being required to message multiple other users to determine whether information of interest is available. Furthermore, the development platform may utilize automatic evaluation of information associated with the agile development project to manage an agile development project, such as by generating calendar entries, assigning developers to tasks, or the like, thereby reducing memory usage and/or usage of processing resources relative to a user manually performing management of the agile development project.

Figure 1:
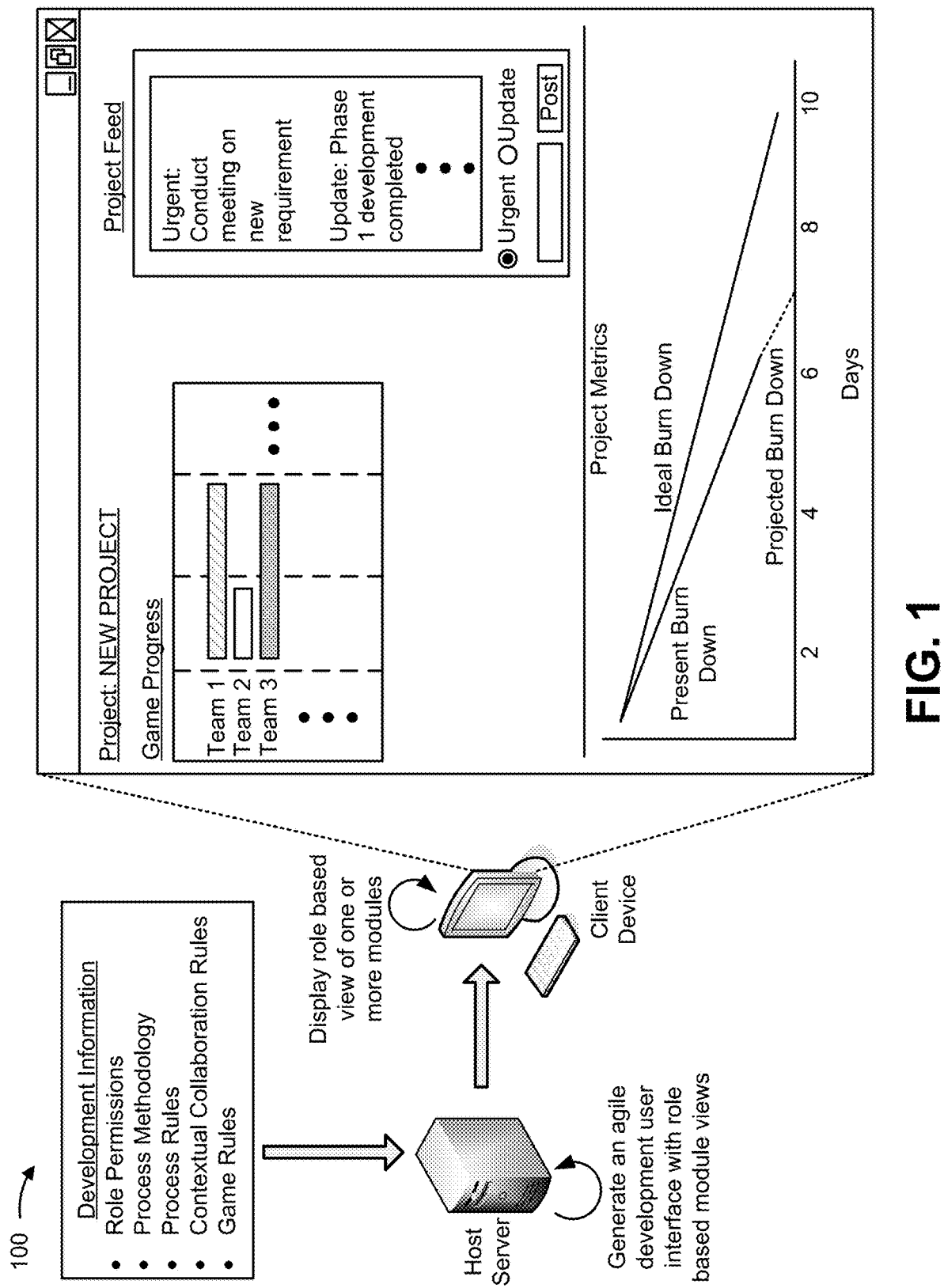
FIG. 1 is a diagram of an overview of an example implementation described herein.

FIG. 1 is a diagram of an overview of an example implementation 100 described herein. As shown in FIG. 1, a host server may obtain information related to an agile development project (e.g., "Development Information"). For example, the host server may obtain information regarding role permissions (e.g., roles for different developers associated with the agile development project), process methodology (e.g., agile techniques for utilization in the agile development project), process rules (e.g., designating associations between tasks, roles, alerts, or the like), contextual collaboration rules (e.g., information associated with intra-team collaboration, inter-team collaboration, or the like), game rules (e.g., information associated with establishing gamification incentives for the agile development project), or the like.

In some implementations, the host server may obtain the information from one or more data structures storing information associated with a development project. For example, the host server may receive information indicating a set of roles for another, similar development project. Additionally, or alternatively, the host server may utilize a data processing technique, such as a machine learning technique, a natural language processing technique, a heuristic technique, or the like to parse data (e.g., data regarding the agile development project, such as a requirements document, a contract, employment information, or the like) to automatically obtain information associated with a development project.

The host server may generate an agile development user interface with role based module views (e.g., role based views of particular modules, such as a game progress module, a project feed module, a project metrics module, or the like) based on the information. For example, the host server may generate, for display in an agile development user interface to a manager of the agile development project, a set of modules associated with facilitating management of progress of a set of developers. Similarly, the host server may generate, for a developer, a set of modules associated with viewing assigned tasks, project updates, alerts, or the like. The host server may provide information associated with the agile development user interface to a client device (e.g., that is utilized by a manager, a developer, or the like), which may provide a role based view of the agile development user interface for display. In this way, the host server generates a customized user interface based on a role of a user to whom the customized user interface is to be presented, rather than providing a single user interface to multiple users. By providing a customized user interface that presents information relevant to a user, the host server may reduce use of processor and/or memory resources relative to providing a user interface with all project information and a user being required to navigate the user interface to locate relevant information.

In this way, a host server generates a customized user interface for an agile development project that facilitates improved project management and improved project fulfillment relative to a project that does not utilize a development platform for management.

Figure 2:
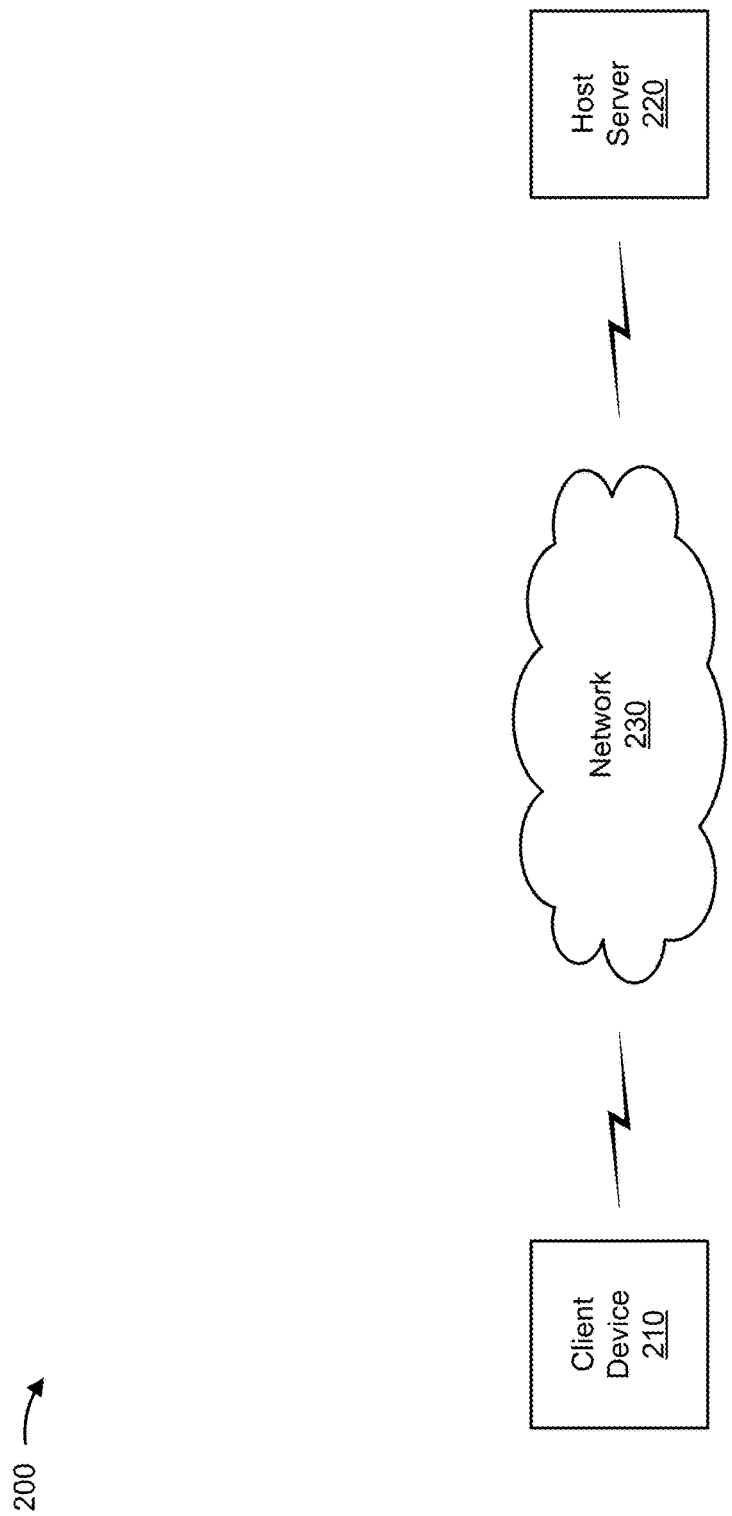
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a host server 220, and a network 230. Devices of environment 200 may interconnect via wired connections, wireless connections, or a combination of wired and wireless connections.

Client device 210 may include one or more devices capable of receiving, generating, storing, processing, and/or providing information associated with an end-to-end agile development platform. For example, client device 210 may include a communication and/or computing device, such as a mobile phone (e.g., a smart phone, a radiotelephone, etc.), a computer (e.g., a laptop computer, a tablet computer, a handheld computer, etc.), a gaming device, a wearable communication device (e.g., a smart wristwatch, a pair of smart eye glasses, etc.), or a similar type of device. In some implementations, client device 210 may provide a user interface with which to configure one or more parameters of an end-to-end agile development platform (e.g., a customized user interface for an agile development project) and/or with which to provide information regarding an agile development project. In some implementations, client device 210 may provide a particular version of the end-to-end agile development platform to facilitate completion of a particular portion of a group task (e.g., the development project) by a particular group of users. In some implementations, client device 210 may receive information from and/or transmit information to another device in environment 200, such as host server 220.

Host server 220 may include one or more devices capable of storing, processing, and/or routing information associated with an end-to-end agile development platform. For example, host server 220 may include a server, or a group of servers, such as a group of servers associated with a cloud computing environment, that obtains information regarding an agile development project and generates a customized user interface for providing information associated with the agile development project, such as project metrics, project progress, game progress, or the like. In some implementations, host server 220 may include a server that utilizes a particular processing technique to automatically evaluate data (e.g., employment data, project data, etc.), such as a machine learning technique, a natural language processing technique, a heuristic technique, an artificial intelligence technique, or the like. In some implementations, host server 220 may include a communication interface that allows host server 220 to receive information from and/or transmit information to other devices in environment 200, such as client device 210.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these of other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, the two or more devices shown in FIG. 2 may be implemented within a single device, or a single device shown in FIG. 2 may be implemented as multiple, distributed devices. For example, although client device 210 and host server 220 are shown as two separate devices, client device 210 and host server 220 may be implemented within a single device. Additionally, or alternatively, a set of devices (e.g., one or more devices) of environment 200 may perform one or more functions described as being performed by another set of devices of environment 200.

Figure 3:
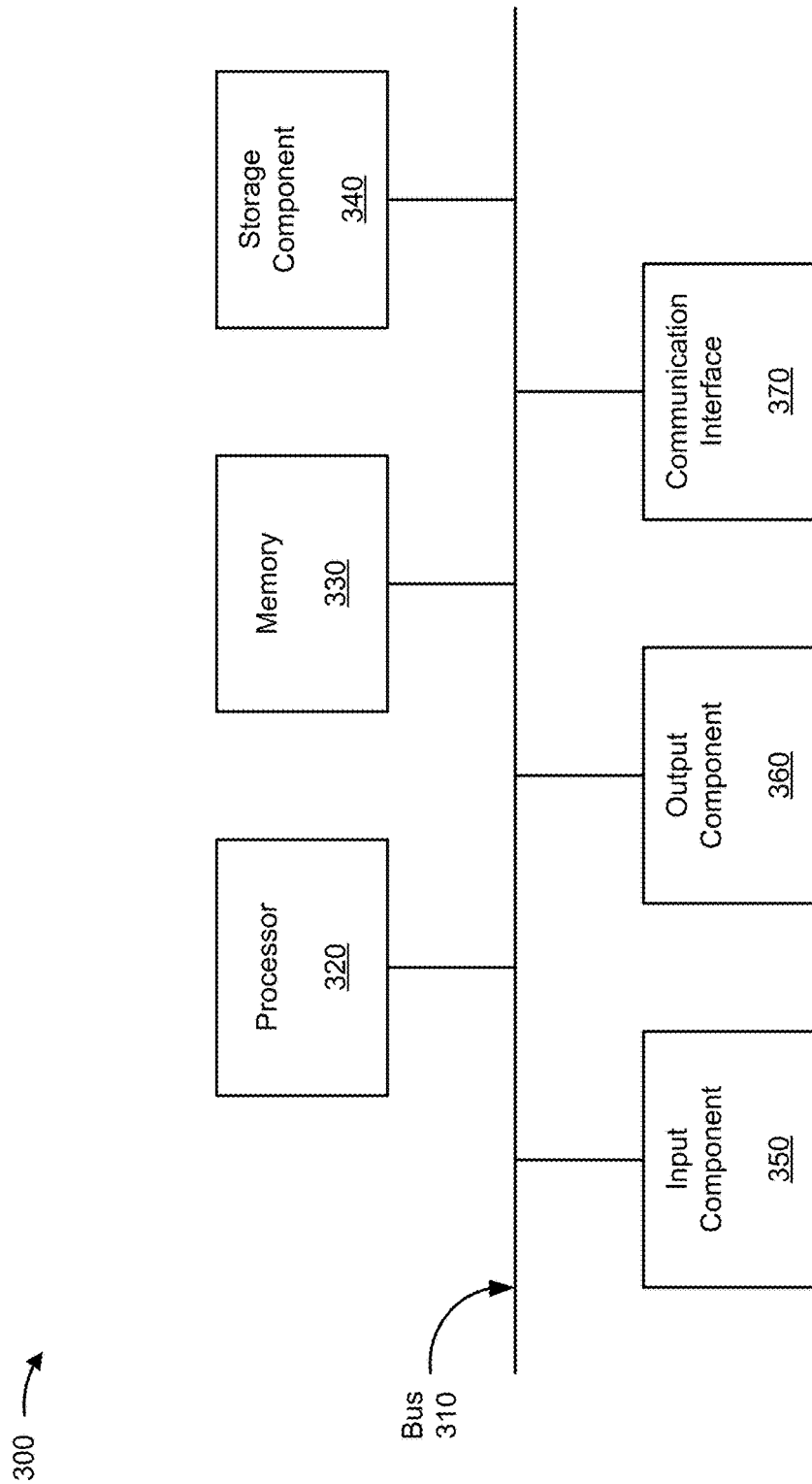
FIG. 3 is a diagram of example components of one or more devices of FIG. 2.

FIG. 3 is a diagram of example components of a device 300. Device 300 may correspond to client device 210 and/or host server 220. In some implementations, client device 210 and/or host server 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device to communicate with other devices, such as via a wired connection, a wireless connection, or a combination of wired and wireless connections. Communications interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as a memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
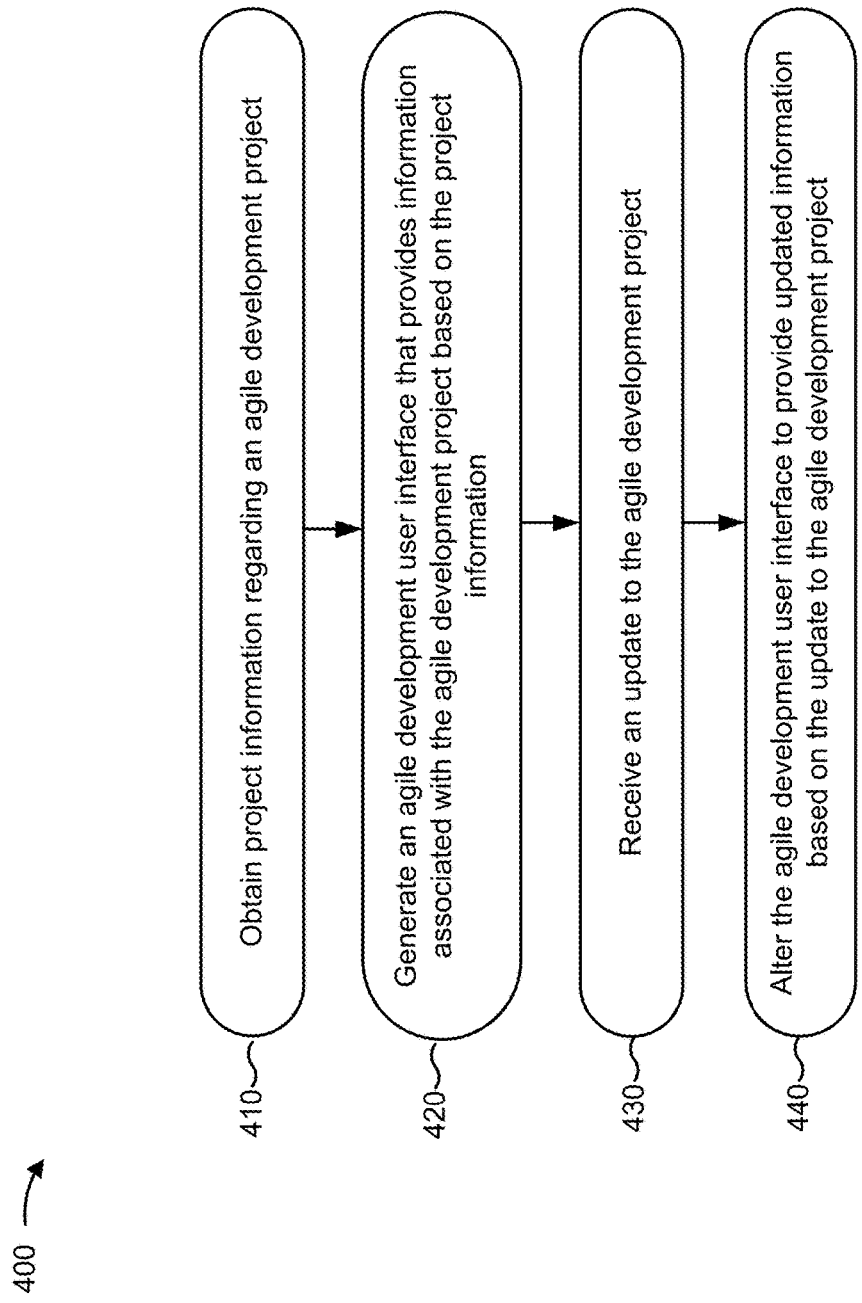
FIG. 4 is a flow chart of an example process for providing end-to-end agile development project governance.

FIG. 4 is a flow chart of an example process 400 for providing end-to-end agile development project governance. In some implementations, one or more process blocks of FIG. 4 may be performed by host server 220. In some implementations, one or more process blocks of FIG. 4 may be performed by another device or a group of devices separate from or including host server 220, such as client device 210.

As shown in FIG. 4, process 400 may include obtaining project information regarding an agile development project (block 410). For example, host server 220 may obtain the project information for the agile development project. In some implementations, host server 220 may obtain the project information from client device 210. For example, client device 210 may provide a user interface with which a user may select project information that is provided to host server 220. Additionally, or alternatively, host server 220 may obtain project information from a data structure. For example, host server 220 may access a data structure storing information regarding other development projects, and may obtain information regarding the other development projects for utilization with the agile development project. In this case, host server 220 may generate scores for the other development projects based on a similarity with the agile development project, and may select information associated with a particular development project, of the other development projects, based on a score associated with the particular development project (e.g., for utilization in projecting progress of the agile development project, for identifying which tasks to assign to which developers for the agile development project, or the like). In some implementations, host server 220 may obtain project information from one or more other agile development tools associated with agile development. For example, host server 220 may query the one or more other agile development tools available to host server 220 to obtain information identifying a set of users, a set of requirements, a set of stages, or the like. In this case, host server 220 may adapt a user interface (e.g., an agile development platform) to permit a user to interact with the user interface to control the one or more other agile development tools, thereby providing a consistent presentation of information from different agile development tools. By providing a consistent presentation of information, host server 220 may reduce usage of processing resources associated with a user locating information as a user can more efficiently find information via a familiar user interface rather than multiple unfamiliar user interfaces.

In some implementations, host server 220 may receive project information associated with configuring an agile development user interface. For example, a user may configure a set of project roles, select a template for the project, select project guidance information associated with one or more other agile development projects, or the like via a user interface of client device 210, and the user selections may be provided to host server 220. In some implementations, host server 220 may provide a configuration user interface with which to configure the agile development user interface. For example, host server 220 may generate one or more user interface elements for the configuration user interface, and host server 220 may receive a selection of a set of preferences relating to the agile development user interface and/or the agile development project via a user interaction with the configuration user interface (e.g., via client device 210).

Host server 220 may obtain project information associated with a set of role permissions, in some implementations. For example, host server 220 may obtain project information indicating that a first user is a first developer associated with a first type of role (e.g., backend development), a second user is a second developer associated with a second type of role (e.g., quality assurance and testing), and a third user is a manager associated with a third type of role (e.g., managing quality assurance and testing during production of a particular version of the agile development project). In this case, each type of role may be associated with different attributes, determined based on agile development process methodologies, and may be provided different information, via a user interface, based on the different attributes.

Additionally, or alternatively, host server 220 may obtain project information identifying a user for another role, such as a product owner (e.g., for whom the agile development project is being developed), a scrum master (e.g., a facilitator for a team of developers), a project manager, a delivery lead (e.g., a team leader for a team of developers), an architect (e.g., a developer associated with conceptually designing a framework for a portion of the agile development project), a tester, an administrator, or the like. In this way, host server 220 may provide information determined to be relevant to a particular user based on the particular user's role. Additional roles, fewer roles, different roles, or the like may be utilized by host server 220 for the agile development project.

Host server 220 may obtain project information associated with agile development process methodology, in some implementations. For example, host server 220 may select a template for the agile development project, from a set of templates. In this case, the template may include a set of guidelines for completion of the agile development project, such as attributes for each user role, attributes for task completion, attributes for task assignment, or the like. Additionally, or alternatively, the template may include information identifying a set of stages for completion of the agile development project, a set of sub-stages for a particular stage, a set of dependencies relating the stages, documentation associated with the agile development project, one or more deadlines associated with the agile development project, a set of checklists for developers of the agile development project, or the like. In this way, host server 220 may obtain information for presentation that may be utilized to ensure compliance with agile development methodologies during completion of the agile development project.

In some implementations, host server 220 may select the template based on the type of development project. For example, a first type of development project may utilize a first template that is governed by first process methodologies and a second type of development project may utilize a second template that is governed by second process methodologies. Additionally, or alternatively, host server 220 may select the template based on a characteristic of the developers assigned for the agile development project, a user selection, a comparison of the agile development project with one or more previous development projects, or the like.

Host server 220 may obtain project information associated with a set of process rules, in some implementations. Process rules may include associations between tasks, roles, alerts, or the like of the agile development project. For example, host server 220 may obtain one or more process rules indicating which developers are assignable to which tasks, and which alerts are provided to each developer based on events associated with the tasks. In this way, host server 220 may obtain information for the agile development user interface that may facilitate assigning tasks to users based on a set of decision criteria (e.g., a role, a competency, a geographical location, etc.), providing information to a user based on a set of decision criteria (e.g., an assigned task, a role, a security clearance, etc.), generating an alert for the user that is determined to be relevant to the user (e.g., based on a set of decision criteria), or the like.

Host server 220 may obtain project information associated with a set of game rules, in some implementations. For example, host server 220 may obtain information indicating goals that are achievable by different development teams completing the agile development project and rewards associated with the goals. Additionally, or alternatively, host server 220 may receive a selection of a particular type of game (e.g., for gamification of a task), of a set of types of games, for utilization during the agile development project, a selection of a period of the agile development project during which the game is to operate, a set of developers that are to participate in the game, or the like. In this case, host server 220 may generate a particular game for one or more groups of users to incentivize the one or more groups of users to perform the task with increased efficiency relative to working without the particular game being provided.

Host server 220 may obtain project information associated with user collaboration, in some implementations. For example, host server 220 may obtain information indicating metrics and/or project updates that are to be provided to a set of developers, a manager, or the like. In this way, host server 220 may obtain information for the agile development user interface that may be utilized to administer one or more games for incentivizing performance by developers of the agile development project.

In some implementations, host server 220 may obtain project information based on processing data associated with the agile development project. For example, host server 220 may apply a natural language processing technique to a requirements document to identify tasks for completion as portions of the agile development project. In this way, host server 220 may reduce processing relative to a user manually providing information identifying tasks. Additionally, or alternatively, host server 220 may apply a machine learning technique to one or more other development projects to generate information regarding the agile development project. For example, host server 220 may utilize the machine learning technique to identify a set of common calendar entries, milestones, tasks, costs, or the like associated with the other development projects. In this case, host server 220 may utilize results of the machine learning technique when providing information associated with the agile development project, such as by automatically generating a set of calendar entries and populating the set of calendar entries for a set of projects. In this way, host server 220 may reduce usage of processing resources associated with identifying and scheduling progress meetings and identifying milestones relative to a user manually reviewing the project, consulting multiple different stakeholders to identify available times for meetings, and establishing the meetings or the milestones. Similarly, host server 220 may identify information that is shared between different users of the other development projects, and may configure a set of rules regarding which information is relevant to which users of the agile development project, thereby facilitating efficient distribution of relevant information to different users. In this way, host server 220 reduces a quantity of messages that are distributed via a network to identify relevant information by utilizing past projects to automatically identify relevant information and automatically distribute the relevant information to users.

As further shown in FIG. 4, process 400 may include generating an agile development user interface that provides information associated with the agile development project based on the project information (block 420). For example, host server 220 may generate the agile development user interface to provide information associated with the agile development project. In some implementations, host server 220 may identify a role of a user of the agile development user interface when generating the agile development user interface. For example, host server 220 may generate a first agile development user interface that presents first information to a developer (e.g., collaboration information determined to be relevant to a developer) and a second agile development user interface that presents second information to a manager (e.g., collaboration information determined to be relevant to a manager). In this way, host server 220 may provide actionable awareness (e.g., relevant information) to a user based on the user's role for the agile development project, thereby reducing usage of processing resources associated with the user locating information relative to providing irrelevant information and reducing memory usage and network bandwidth requirements by reducing a quantity of information that is actually provided relative to providing all information regarding a project.

In some implementations, host server 220 may determine which information is relevant for a user based on a role of the user, a location of the user, or the like. For example, a user in a first location may be provided information regarding a second location to facilitate cross-geographical collaboration. In this way, host server 220 automatically enables cross-geographical collaboration, rather than requiring geographically disparate users to maintain separate communications regarding the project.

In some implementations, host server 220 may determine one or more modules to include in the agile development user interface when generating the agile development user interface. For example, host server 220 may select a game progress module, a project feed module, a project metrics module, or the like based on a user selection, another agile development user interface associated with another agile development project, or the like. In some implementations, host server 220 may determine the one or more modules based on a stage of the agile development project. For example, host server 220 may determine that a particular stage of the agile development project is to include a game for multiple sets of developers, and may select a game progress module for the agile development user interface to provide information regarding game progress to a manager. In this way, host server 220 may provide gamification information that facilitates incentivization of best practices, reduced development time (relative to non-gamified development), or the like. Based on automatically administering the game (e.g., monitoring progress and/or completion of tasks associated with the game) and distributing information relating to the game (e.g., game score updates regarding members of a team, members of another team that is competing against the team in the game, etc.), host server 220 may reduce computing associated with the development project by increasing efficiency of the agile development project relative to an agile development project completed without a gamification element.

In some implementations, host server 220 may include a module that provides information associated with another agile development tool. For example, host server 220 may incorporate information associated with another agile development tool and/or user interface elements associated with controlling the other agile development tool into the agile development user interface. In this way, host server 220 may integrate other development tools with other functionalities to facilitate better agile development than failing to utilize the other tools in combination with the agile development user interface. Moreover, by integrating information of other development tools into a common and familiar user interface, host server 220 may reduce a quantity of user interactions with the user interface utilized to locate relevant information, thereby reducing usage of processing resources associated with operating the user interface.

In some implementations, host server 220 may identify one or more users that are to receive access to the agile development user interface. For example, host server 220 may select a set of developers, a set of managers, or the like that are to be provided the agile development user interface for providing information, altering information, updating information, or the like. In some implementations, host server 220 may select multiple users to receive multiple versions of the agile development user interface. For example, host server 220 may select a first user (e.g., a developer), and may provide first data regarding an agile development project to the first user via a first version of the agile development user interface (e.g., information identifying a task for completion by the developer). Further to the example, host server 220 may select a second user (e.g., a manager), and may provide second data regarding the agile development project to the second user via a second version of the agile development user interface (e.g., information associated with tracking completion of the task by the developer). In this case, host server 220 may provide update information to the second user, milestone progress information to the second user or the like, thereby facilitating completion of the task by the first user and project management by the second user.

In some implementations, host server 220 may generate different visualizations of information for different users. For example, host server 220 may provide a first type of module associated with visualizing a project metric to a first user associated with a first role and a second type of the module associated with visualizing the project metric (or another project metric) to a second user associated with a second role. In this way, host server 220 may customize the agile development user interface to provide information more likely to be relevant to a particular user relative to a user interface that utilizes the same visualizations of information for each user, thereby reducing memory usage based on reducing irrelevant information provided and reducing usage of processing resources based on reducing user interactions utilized to locate relevant information.

In some implementations, host server 220 may provide the agile development user interface for utilization. For example, host server 220 may provide a notification indicating that a user may access the agile development user interface via client device 210, and may provide a version of the agile development user interface to client device 210. In this case, host server 220 may encapsulate the set of modules into one or more artifacts, and may provide the one or more artifacts to client device 210 for utilization. In some implementations, host server 220 may facilitate synchronization between multiple client devices 210 that are providing versions of the agile development user interface. For example, host server 220 may receive information from a first client device 210 (e.g., a project update, a chat message associated with a collaboration functionality, or the like), and may provide the information to one or more second client devices 210.

As further shown in FIG. 4, process 400 may include receiving an update to the agile development project (block 430). For example, host server 220 may receive an update associated with the agile development project. In some implementations, host server 220 may receive the update based on monitoring the agile development project. For example, host server 220 may monitor the agile development project to determine that a threshold associated with the update has been satisfied (e.g., a development milestone has been achieved). Additionally, or alternatively, host server 220 may receive the update based on a user interaction with the user interface. For example, host server 220 may provide the agile development user interface for utilization by a user of client device 210, and may receive information identifying an update to the agile development project (e.g., completion of a task, partial completion of a task, etc.).

In some implementations, host server 220 may generate the update to the agile development project. For example, host server 220 may determine, based on a particular quantity of time elapsing, that a value of a project metric has changed, and may update the agile development project user interface based on the value of the project metric changing. Additionally, or alternatively, host server 220 may determine that a threshold deviation from a template, an agile process, or the like has occurred, and may generate the update to the agile development user interface based on determining that the threshold deviation has occurred. In this way, host server 220 may ensure compliance with agile methodologies and/or one or more processes associated therewith.

As further shown in FIG. 4, process 400 may include altering the agile development user interface to provide updated information based on the update to the agile development project (block 440). For example, host server 220 may alter the agile development user interface to provide updated operation information. In this way, host server 220 ensures that the agile development user interface provides information relevant to a user (rather than outdated, irrelevant information), thereby reducing a quantity of user interactions received to locate relevant information relative to providing the outdated, irrelevant information.

In some implementations, host server 220 may alter the agile development user interface to include the updated information. For example, host server 220 may update a project timeline to include the updated information and/or one or more events associated therewith (e.g., completion of a task, completion of a stage of the agile development project, or the like). Additionally, or alternatively, host server 220 may update a calendar associated with the agile development project, such as by generating a calendar entry corresponding to the updated information (e.g., an updated timeline, an updated set of events, an updated milestone, etc.), and may populate the calendar entry to a calendar utilized by the user (e.g., a calendar included in the agile development user interface, a calendar separate from the agile development user interface, or the like).

Additionally, or alternatively, host server 220 may remove information from the agile development user interface. For example, host server 220 may determine that information is no longer relevant to a user based on the update (e.g., information regarding tasks of a first stage may lack relevancy to a developer when the developer progresses to a second stage), and may remove the information from a data structure storing information for the agile development user interface. In this way, host server 220 may reduce memory usage relative to permitting information that is no longer relevant to remain in a data structure associated with the agile development user interface. In some implementations, host server 220 may alter the user interface to include a portion of the updated information. For example, host server 220 may select a portion of the updated information (e.g., based on information being provided via the user interface, via a role of a user to whom the user interface is being provided, etc.), and may provide the portion of the updated information via the agile development user interface.

In some implementations, host server 220 may update the set of modules provided via the agile development user interface. For example, host server 220 may identify another module that is not provided via the agile development user interface, and may cause the other module to be added to the agile development user interface to provide the updated information. Additionally, or alternatively, host server 220 may determine that the updated information indicates that the agile development project has entered another stage of development, and host server 220 may select one or more other modules associated with the other stage of development to provide via the agile development user interface.

In some implementations, host server 220 may generate an alert that is provided via the agile development user interface. For example, host server 220 may generate an alert relating to process adherence to an agile development process, and may provide the alert via the agile development user interface. In this way, host server 220 may facilitate user awareness of alterations to the agile development project, thereby reducing network communications between different users associated with the agile development project desiring to remain aware of alterations to the agile development project. Additionally, or alternatively, host server 220 may provide the alert for display without providing the alert via the agile development user interface, such as by sending an email to a manager identifying the alert. In this case, the email may indicate that an alert is available for viewing via the agile development user interface. In this way, host server 220 may ensure that a user can receive an alert even when not utilizing the agile development user interface.

In some implementations, host server 220 may generate a recommendation associated with the alert. For example, when host server 220 generates an alert associated with a deviation from an agile development process, host server 220 may generate (e.g., based on a processing technique) a recommendation for an alteration that mitigates the deviation from the agile development process, such as based on information regarding one or more other agile development projects and deviations to agile development processes associated therewith. In this way, host server 220 may provide information to a manager to facilitate the manager maintaining agile methodologies during the agile development project.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example implementation 500 relating to example process 400 shown in FIG. 4. FIGS. 5A-5F show an example of providing end-to-end agile development project governance.

Figure 5A:
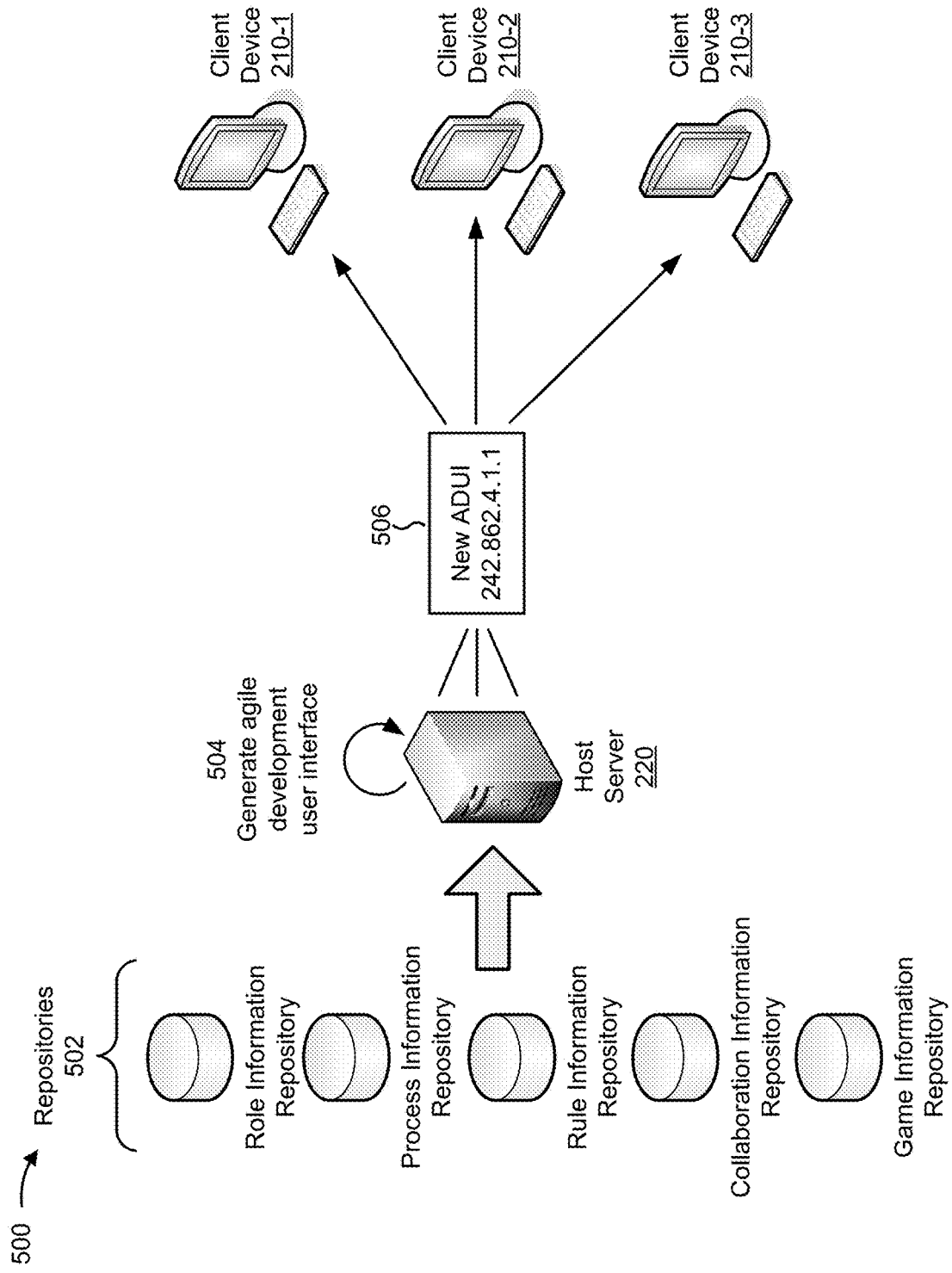
FIGS. 5A-5F are diagrams of an example implementation relating to the example process shown in FIG. 4.

As shown in FIG. 5A, host server 220 obtains project information, such as role information, process information, rule information, collaboration information, game information, or the like, from repositories 502. As shown by reference number 504, host server 220 generates an agile development user interface. As shown by reference number 506, host server 220 provides information associated with providing, to a set of client devices 210-1, 210-2, and 210-3, access to the agile development user interface (e.g., "New ADUI" at a particular Internet protocol address).

Figure 5B:
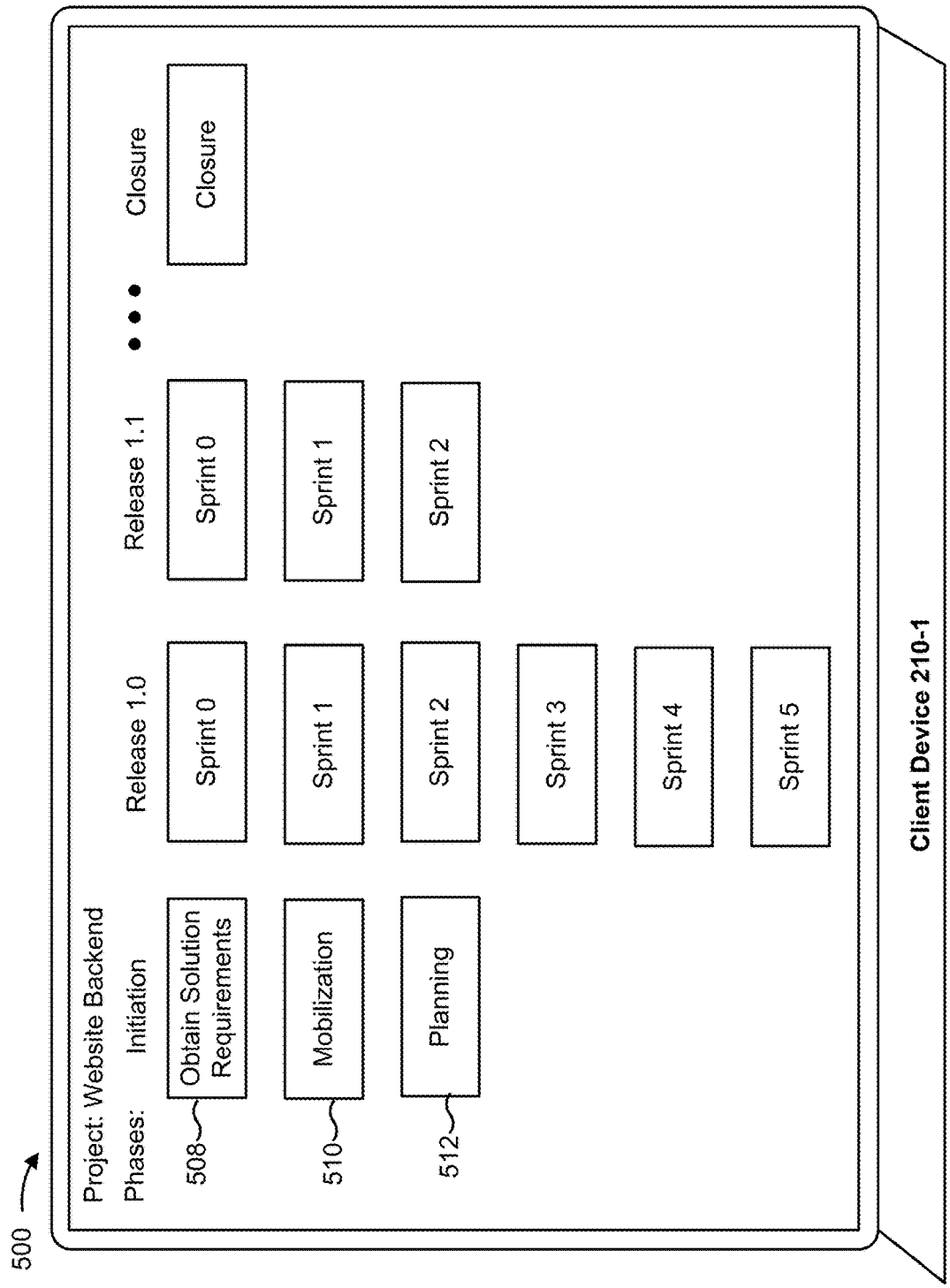

As shown in FIG. 5B, client device 210-1 provides the agile development user interface to a particular user. The agile development user interface includes user interface elements (e.g., a set of labeled buttons) associated with providing a view of information regarding an initiation phase, a set of release phases, and a closure phase. As shown by reference numbers 508-512, the initiation phase facilitates a first stage for obtaining solution requirements (e.g., requirements of the agile development project ("Web site Backend"), a second stage for mobilization (e.g., assigning and/or allocating one or more resources), a third stage for planning (e.g., generating a timeline), or the like. Based on a user interaction with a button, a user may view information regarding a stage of the initiation phase and/or provide information to customize the initiation phase.

As further shown in FIG. 5B, each release phase (e.g., "Release 1.0," "Release 1.1," etc.) includes a set of sprints (e.g., segments of development). A user interaction with a button to select a particular sprint may cause the agile development user interface to provide information regarding the particular sprint (e.g., a schedule, a set of tasks, a set of developers assigned to a particular task, etc.) and/or may facilitate alteration of the particular sprint. The closure phase may include one or more agile process steps, guidelines for which may be provided via the agile development user interface. A user interaction with a closure phase button may cause the agile development user interface to provide and/or facilitate alteration of information regarding closure of the agile development process. Information regarding the phases may dynamically update based on updates to the agile development project, thereby facilitating management and/or fulfillment of the agile development project. Assume that a user selects a button causing the agile development user interface to provide information regarding the planning stage.

Figure 5C:
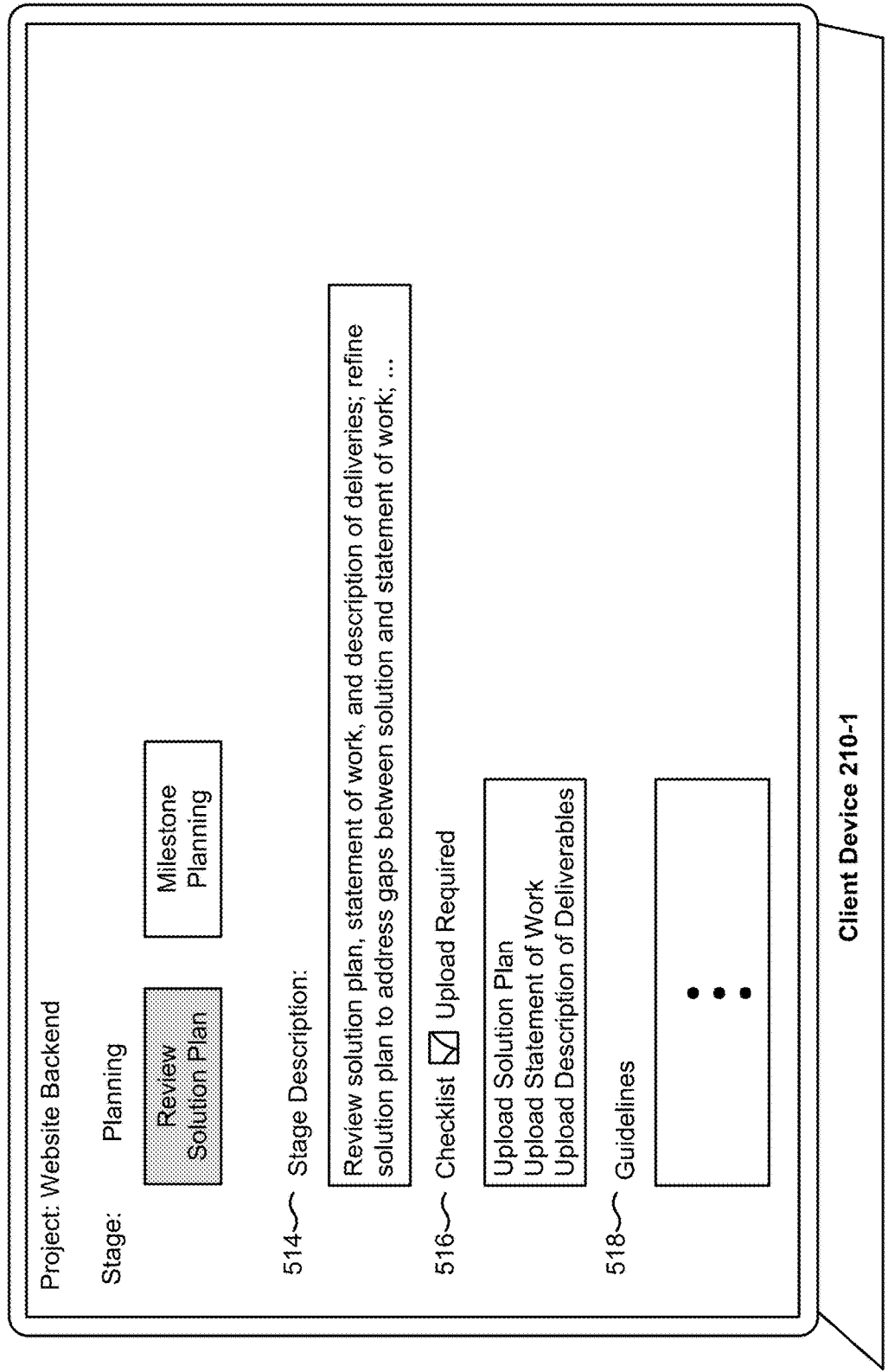

As shown in FIG. 5C, client device 210-1 provides information regarding the planning stage of the initiation phase. The planning stage includes a set of sub-stages, such as a review solution plan sub-stage and a milestone planning sub-stage. As shown by reference number 514, the agile development user interface includes information indicating tasks for the review solution plan sub-stage, such as reviewing the solution plan, statement of work, and description of deliveries; refining the solution plan to address gaps between the solution and the statement of work; or the like. As shown by reference number 516, the agile development user interface includes an option for a manager to require an upload of information by the user to fulfill tasks of a particular stage. Assume that host server 220 causes the option to default to being selected when the agile development user interface is provided by client device 210-1, thereby requiring the user to upload a solution plan, a statement of work, and a description of deliverables before the stage is complete. As shown by reference number 518, the agile development user interface may include, for display, a set of guidelines regarding completion of the stage.

Figure 5D:
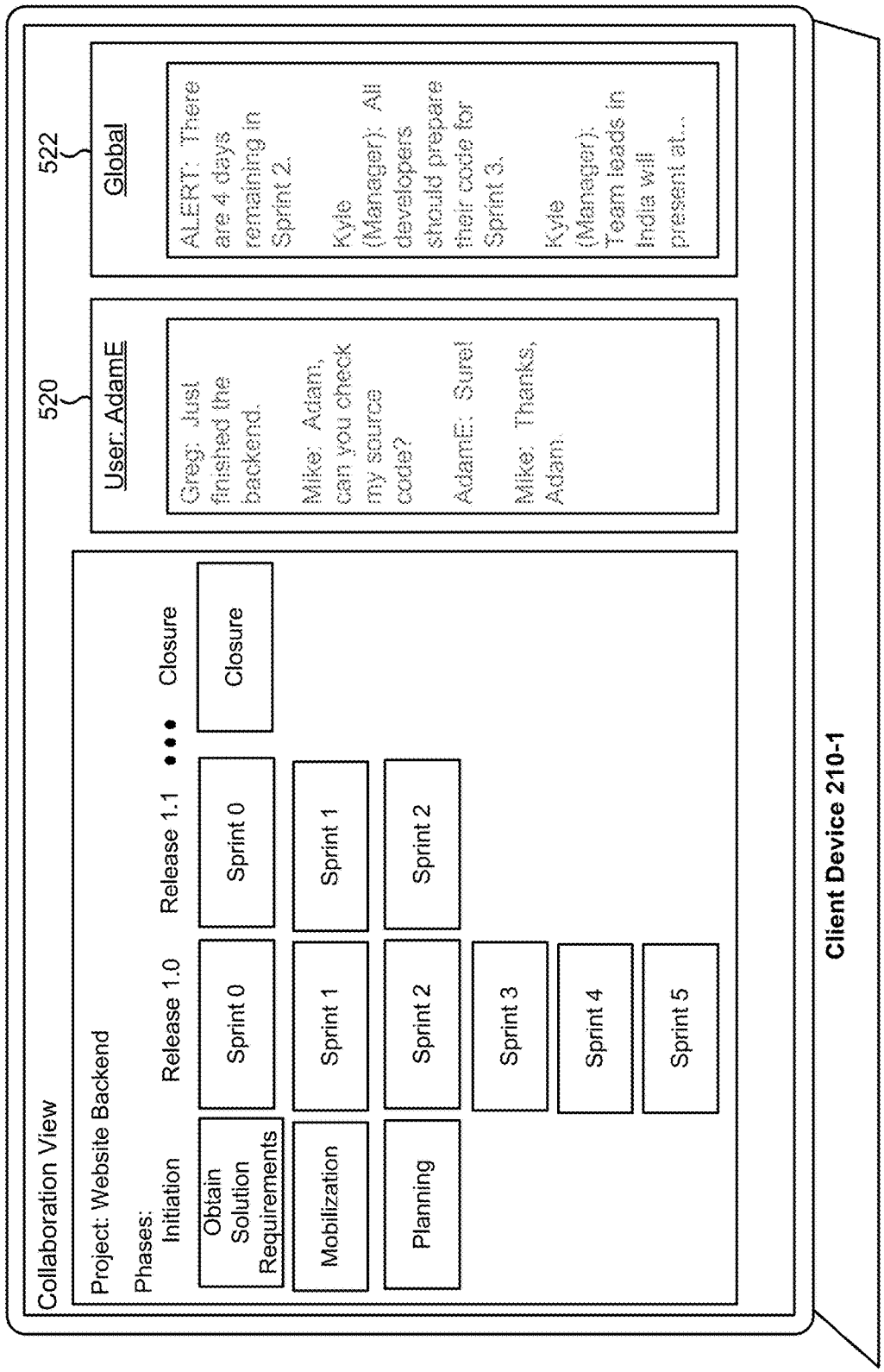

As shown in FIG. 5D, client device 210-1 provides a collaboration view of the agile development user interface for display to another user. In the collaboration view, the agile development user interface includes a set of user interface elements associated with user collaboration. As shown by reference number 520, a first user interface element, of the set of user interface elements, provides collaboration information relevant to the user ("AdamE"), such as updates from developers working from other locations. As shown by reference number 522, a second user interface element, of the set of user interface elements, provides information regarding global updates (e.g., to the agile development project) not determined to be relevant to the other user, such as alerts for other development teams, management announcements not directed at the user, or the like.

Figure 5E:
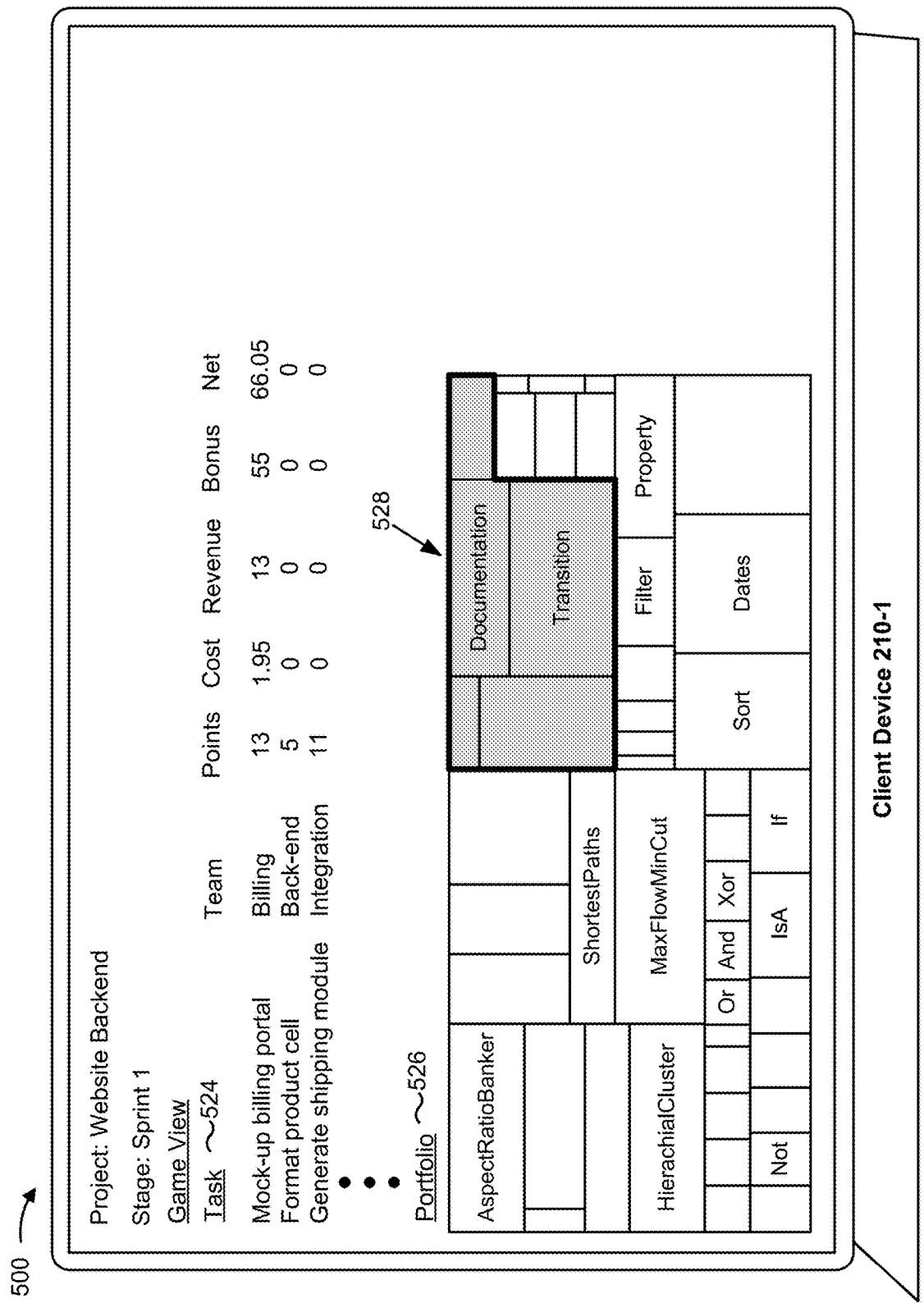

As shown in FIG. 5E, client device 210-1 provides a game view of the agile development user interface. As shown by reference number 524, the game view includes information identifying tasks, assignments (e.g., "Team"), and rewards (e.g., "Points," "Cost," "Revenue," "Bonus," and "Net") for a game. As shown by reference number 526, a customized visualization may be provided for the game to indicate progress in completion of the tasks of the game. As shown by reference number 528, the customized visualization may include an indication of a portion of the visualization relating to activity of the user who is utilizing the agile development user interface. Assume that the information regarding the games dynamically updates when host server 220 receives information regarding the agile development project, thereby facilitating tracking of a status of a particular game by the user.

Figure 5F:
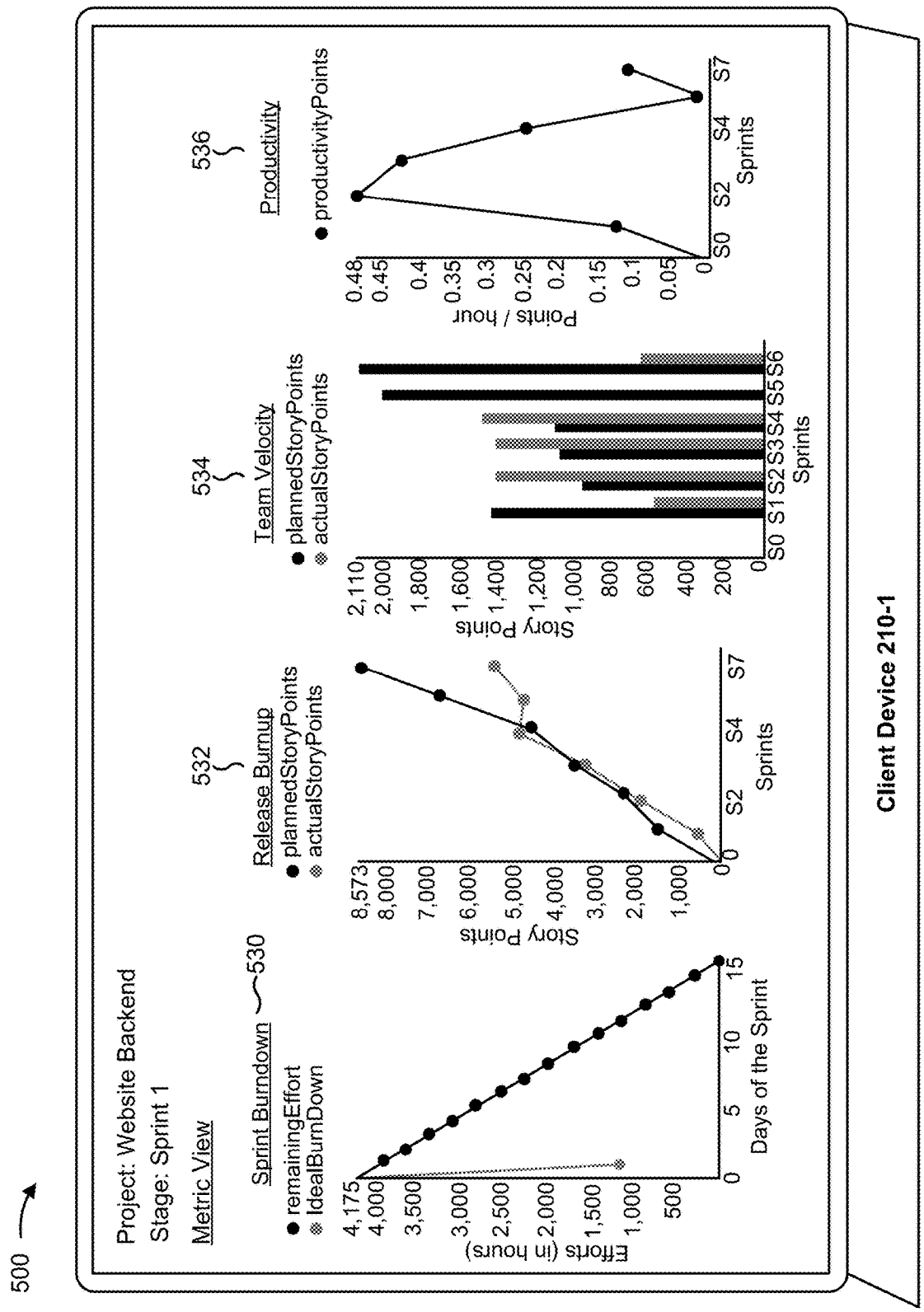

As shown in FIG. 5F, client device 210-1 provides a metrics view of the agile development user interface. As shown by reference numbers 530-536, the metrics view includes metrics relating to sprint burn-down (e.g., remaining days and effort (in hours) of the stage), release burn-up (e.g., milestones ("story points") achieved during the stage), team velocity (e.g., a rate at which milestones are achieved by a particular set of developers during each stage), and productivity (e.g., a rate at which milestones are being achieved on an hourly basis during each stage). Assume that the information regarding the metrics dynamically updates when host server 220 receives information updating a status of the agile development project, thereby facilitating project management and oversight.

As indicated above, FIGS. 5A-5F are provided merely as an example. Other examples are possible and may differ from what was described with regard to FIGS. 5A-5F.

In this way, an agile development user interface (generated by host server 220) may provide information regarding an agile development project to facilitate improved management of the agile development project relative to other tools for agile development. Moreover, based on selectively providing the information via customized user interfaces to different users based on attributes of the users (e.g., roles, competencies, geographies, etc.), host server 220 may reduce memory usage required for each user interface and usage of processing resources required for a particular user to locate relevant information in a particular user interface relative to providing all information with and/or via each user interface.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
  one or more processors to:
    provide a platform user interface for an agile development platform that manages an agile development project;
    detect a tool, relating to management of agile development, accessible to the device,
      the tool having a different user interface than the platform user interface;
    integrate the tool into the platform user interface;
    provide access to and control of the tool via the platform user interface based on the tool being integrated into the platform user interface;
    generate, for display by the platform user interface, information associated with one or more modules;
    receive first data associated with the agile development project and other development projects,
      the first data being received at least in part from the tool and based on the tool being accessible and controllable via the platform user interface;
    apply a natural language processing technique to parse the first data and identify portions of a group task for the agile development project;
    automatically evaluate the first data to identify a plurality of users, where each user, of the plurality of users, is assigned to complete a portion of the portions of the group task;
    apply a machine learning technique to the other development projects to generate scores based on a similarity with the agile development project;
    select other project information associated with a particular development project, of the other development projects, based on a score, of the scores, associated with the particular development project;

automatically evaluate the first data to select a first user, of the plurality of users, for completion of a particular portion of the group task based on a first set of decision criteria, the other project information associated with the particular development project, and the score associated with the particular development project,
   the first set of decision criteria being associated with at least one of a role, a competency, or a geographic location;
configure a set of rules regarding which information is relevant to the plurality of users based on information shared between different users of the other development projects;
provide, to the first user via the platform user interface and based on the set of rules, information identifying the particular portion of the group task;
receive second data relating to the particular portion of the group task after providing the information identifying the particular portion of the group task;
automatically evaluate the first data to select a second user, of the plurality of users, based on a second set of decision criteria,
   the second user being different from the first user;
provide, to the second user via the platform user interface and based on the set of rules, information associated with the second data;
receive an update to the agile development project based on monitoring the agile development project;
identify that a value of a project metric has changed by a threshold deviation based on receiving the update; and
alter the platform user interface to provide updated information based on the update to the agile development project,
   wherein another module is displayed by the platform user interface to provide the updated information.

2. The device of claim 1, where the one or more processors are further to:
determine a set of milestones associated with completion of the particular portion of the group task;
determine, based on the second data, that a particular milestone, of the set of milestones, is achieved; and
where the one or more processors, when providing the information associated with the second data, are to:
   provide information indicating that the particular milestone is achieved.

3. The device of claim 1, where the particular portion of the group task is a first particular portion of the group task; and
where the one or more processors are further to:
   automatically evaluate the first data to generate a game associated with completion of the first particular portion of the group task by the first user and completion of a second particular portion of the group task by a third user;
   automatically evaluate the second data to determine a first game score for the first user based on progress completing the first particular portion of the group task by the first user;
   receive third data identifying a second game score for the third user based on progress completing the second particular portion of the group task by the third user; and
   where the one or more processors, when providing the information associated with the second data, are to:
      provide information identifying the first game score and the second game score.

4. The device of claim 1, where the one or more processors are further to:
determine a projected impact on a schedule associated with the group task based on information, identifying a progress of completion of the particular portion of the group task by the first user, included in the second data;
generate an updated schedule for the group task based on the projected impact on the schedule; and
where the one or more processors, when providing the information associated with the second data, are to:
   provide information identifying the updated schedule for the group task.

5. The device of claim 1, where the one or more processors are further to:
obtain, from a data structure, a set of agile methodology rules,
   the set of agile methodology rules relating to organizing completion of the group task; and
where the one or more processors, when automatically evaluating the first data to select the first user for completion of the particular portion of the group task, are to:
   select the first user based on the set of agile methodology rules.

6. The device of claim 1, where the one or more processors are further to:
identify a set of requirements included in the first data,
   the set of requirements corresponding to the group task;
automatically evaluate the set of requirements to generate a set of portions of the group task based on the set of requirements,
   the set of portions including the particular portion;
monitor completion of the set of portions of the group task;
determine that each portion, of the set of portions, is complete based on the set of requirements; and
provide information indicating that the group task is complete based on determining that each portion of the group task is complete.

7. A method, comprising:
providing, by a device, a platform user interface for an agile development platform that manages an agile development project;
detecting, by the device, a tool relating to management of agile development and accessible to the device,
   the tool having a different user interface than the platform user interface;
integrating the tool into the platform user interface;
providing, by the device, access to and control of the tool via the platform user interface based on the tool being integrated into the platform user interface;
generating, by the device and for display by the platform user interface, information associated with one or more modules;
selecting, by the device, a particular task, from a set of tasks of the agile development project, for completion by one or more users of a set of users assigned to the agile development project;
applying, by the device, a machine learning technique to other development projects to generate scores based on a similarity with the agile development project;
selecting, by the device, other project information associated with a particular development project, of the other development projects, based on a score, of the scores, associated with the particular development project;

selecting, by the device, the one or more users, for completion of the particular task based on a first set of decision criteria, the other project information associated with the particular development project, and the score associated with the particular development project,
   the first set of decision criteria being associated with at least one of a role, a competency, or a geographic location;

configuring, by the device, a set of rules regarding which information is relevant to the one or more users based on information shared between different users of the other development projects;

providing, by the device and via the platform user interface, information associated with identifying the particular task to the one or more users based on selecting the one or more users and the set of rules;

monitoring, by the device, progress of completion of the particular task by the one or more users;

providing, by the device, the platform user interface, for display to another user of the set of users,
   the platform user interface including a set of projections relating to completion of the agile development project that includes the particular task based on the progress of completion of the particular task;

receiving, by the device, an update to the agile development project based on monitoring the agile development project;

identifying, by the device, that a value of a project metric has changed by a threshold deviation based on receiving the update; and altering, by the device, the platform user interface to provide updated information based on the update to the agile development project,
   wherein another module is displayed by the platform user interface to provide the updated information.

8. The method of claim 7, further comprising:
generating the information associated with identifying the particular task,
   where generating the information associated with identifying the particular task comprises:
     selecting a game-type from a set of game-types for establishing a game relating to completing the particular task;
     adapting the game-type to the particular task;
     selecting another one or more users from the set of users as members of a first team for the game,
   the one or more users being members of a second team for the game; and
where providing the information associated with identifying the particular task comprises:
   providing, to the members of the second team, information associated with identifying the game and the members of the first team; and
   providing, to the members of the first team, information associated with identifying the game and the members of the second team.

9. The method of claim 8, where monitoring progress of completion of the particular task comprises:
monitoring the game to determine a score for the game;
providing, via the platform user interface, the score for the game to the other user;
providing, via the platform user interface, the score for the game to the members of the first team; and
providing, via the platform user interface, the score for the game to the members of the second team.

10. The method of claim 7, where generating the information associated with identifying the particular task comprises:
obtaining agile development methodology information;
determining, based on the agile development methodology information, a set of milestones relating to completion of the particular task; and
where providing the information associated with identifying the particular task comprises:
providing information identifying the set of milestones.

11. The method of claim 7,
where providing access to and control of the tool via the platform user interface comprises:
   providing access to information generated by the tool via the platform user interface.

12. The method of claim 7, further comprising:
receiving a communication from a user of the one or more users via a user interface being provided to the user of the one or more users;
determining that the communication is relevant to the other user based on a particular role of the other user; and
causing the communication from the user of the one or more users to be provided via the user interface based on determining that the communication is relevant to the other user.

13. The method of claim 7, where generating the information associated with identifying the particular task comprises:
generating a set of progress meetings for reviewing progress associated with completing the particular task; and
populating the set of progress meetings to one or more calendars utilized by the one or more users and to another calendar utilized by the other user.

14. A non-transitory computer-readable medium storing instructions, the instructions comprising:
one or more instructions that, when executed by one or more processors, cause the one or more processors to:
   provide a platform user interface for an agile development platform that manages an agile development project;
   detect a tool, relating to management of agile development, accessible to the one or more processors,
     the tool having a different user interface than the platform user interface;
   integrate the tool into the platform user interface;
   provide access to and control of the tool via the platform user interface based on the tool being integrated into the platform user interface;
   generate, for display by the platform user interface, information associated with one or more modules;
   receive first data associated with the agile development project and other development projects,
     the first data being received at least in part from the tool and based on the tool being accessible and controllable via the platform user interface;
   apply a natural language processing technique to parse the first data and identify portions of a group task for the agile development project;
   automatically evaluate the first data to identify a plurality of users, where each user, of the plurality of users, is assigned to complete a portion of the portions of the group task;

apply a machine learning technique to the other development projects to generate scores based on a similarity with the agile development project;
select other project information associated with a particular development project, of the other development projects, based on a score, of the scores, associated with the particular development project;
automatically evaluate the first data to select a first user, of the plurality of users, for completion of a particular portion of the group task based on a first set of decision criteria, the other project information associated with the particular development project, and the score associated with the particular development project,
the first set of decision criteria being associated with at least one of a role, a competency, or a geographic location;
configure a set of rules regarding which information is relevant to the plurality of users based on information shared between different users of the other development projects;
provide, to the first user via the platform user interface and based on the set of rules, information identifying the particular portion of the group task;
receive second data relating to the particular portion of the group task after providing the information identifying the particular portion of the group task;
automatically evaluate the first data to select a second user, of the plurality of users, based on a second set of decision criteria,
the second user being different from the first user;
provide, to the second user via the platform user interface and based on the set of rules, information associated with the second data;
receive an update to the agile development project based on monitoring the agile development project;
identify that a value of a project metric has changed by a threshold deviation based on receiving the update; and
alter the platform user interface to provide updated information based on the update to the agile development project,
wherein another module is displayed by the platform user interface to provide the updated information.

15. The computer-readable medium of claim 14, where the one or more instructions, when executed by the one or more processors, further cause the one or more processors to:
determine a set of milestones associated with completion of the particular portion of the group task;
determine, based on the second data, that a particular milestone, of the set of milestones, is achieved; and
where the one or more instructions, when providing the information associated with the second data, are to:
provide information indicating that the particular milestone is achieved.

16. The computer-readable medium of claim 14, where the particular portion of the group task is a first particular portion of the group task; and
where the one or more instructions, when executed by the one or more processors, further cause the one or more processors to:
automatically evaluate the first data to generate a game associated with completion of the first particular portion of the group task by the first user and completion of a second particular portion of the group task by a third user;
automatically evaluate the second data to determine a first game score for the first user based on progress completing the first particular portion of the group task by the first user;
receive third data identifying a second game score for the third user based on progress completing the second particular portion of the group task by the third user; and
where the one or more instructions, when providing the information associated with the second data, are to:
provide information identifying the first game score and the second game score.

17. The computer-readable medium of claim 14, where the one or more processors are further to:
determine a projected impact on a schedule associated with the group task based on information, identifying a progress of completion of the particular portion of the group task by the first user, included in the second data;
generate an updated schedule for the group task based on the projected impact on the schedule; and
where the one or more processors, when providing the information associated with the second data, are to:
provide information identifying the updated schedule for the group task.

18. The computer-readable medium of claim 14, where the one or more instructions, when executed by the one or more processors, further cause the one or more processors to:
obtain, from a data structure, a set of agile methodology rules,
the set of agile methodology rules relating to organizing completion of the group task; and
where the one or more instructions, when automatically evaluating the first data to select the first user for completion of the particular portion of the group task, cause the one or more processors to:
select the first user based on the set of agile methodology rules.

19. The computer-readable medium of claim 14, where the one or more instructions, when executed by the one or more processors, further cause the one or more processors to:
identify a set of requirements included in the first data,
the set of requirements corresponding to the group task;
automatically evaluate the set of requirements to generate a set of portions of the group task based on the set of requirements,
the set of portions including the particular portion;
monitor completion of the set of portions of the group task;
determine that each portion, of the set of portions, is complete based on the set of requirements; and
provide information indicating that the group task is complete based on determining that each portion of the group task is complete.

20. The computer-readable medium of claim 14, where the one or more instructions, that cause the one or more processors to automatically evaluate the first data, cause the one or more processors to:
automatically evaluate the first data using:
a machine learning technique,
a heuristic technique, or
an artificial intelligence technique.

* * * * *